April 9, 1935.  F. H. RICHTERKESSING  1,997,016

REMOTE CONTROL CIRCUIT CHANGER

Filed Dec. 9, 1930

INVENTOR.
FRANK H. RICHTERKESSING

BY John L. Milton

ATTORNEY.

Patented Apr. 9, 1935

1,997,016

UNITED STATES PATENT OFFICE 1,997,016

REMOTE CONTROL CIRCUIT CHANGER

Frank H. Richterkessing, Louisville, Ky.

Application December 9, 1930, Serial No. 501,071

24 Claims. (Cl. 246—227)

My invention relates to circuit changers for track switches, automatically operated from a trolley car.

One object of my invention is to utilize the application of "power on" or "power off" to the motors of the car for selecting the position of the switch tongue, the system as hereinafter described.

Another object of my invention is to provide a system in which the possibility of current flowing through both track switch solenoids simultaneously is eliminated.

Another object of my invention is to provide a system in which a "power off" switch operation is prevented after the system has been initially operated with "power on" or vice versa.

A still further object of my invention is to provide a system, which will avoid the breaking of any currents by the current collector or trolley wheel which may be of sufficient magnitude to cause a destructive arc.

A still further object of my invention is to provide a system in which a definite time interval is established for switch operation independent the position of the current collector after the current collector has engaged the trolley contactor.

Another feature of my invention is to provide a safe control system embodying relays and circuits of much simpler nature than heretofore employed in combination with electric track switch operation. This feature is highly desirable for protection and service.

My invention resides in the new and novel combination, construction and relation of the various electrically operated switches, circuits and other parts hereinafter more fully described and disclosed in the drawing accompanying my specification, in which—

My invention is intended primarily for use with those cars which are operated by means of an overhead trolley wheel or current collector W mounted on a car by means of a trolley pole V, although it may be operated by cars in which current is supplied thereto by other methods.

Most cars are equipped with heaters U, lights A and air compressors F which are connected between the trolley pole and the ground G. The cars are also equipped with operating motors M and a controller N for regulating the flow of current thereto, which is directly under the control of the car operator. When the controller is closed, current will flow through the motors M, and this position I will term as "power on", and when the controller is open, no current will flow through the motors, and this position I will term "power off". The controller N does not in any way affect the current flowing through the apparatus U, A or F which I will hereinafter refer to as the auxiliary car current. I have arranged the system herein described so that the track switch will be operated to the straight ahead position when the current collector W engages the trolley conductor D with power off, and the track switch will be operated to the curve position when the current collector engages the system using power on. This operation of the track switch, however, may be reversed by merely transposing the connections of the track switch operating solenoids, as is very evident to those skilled in the art.

Figure 1:
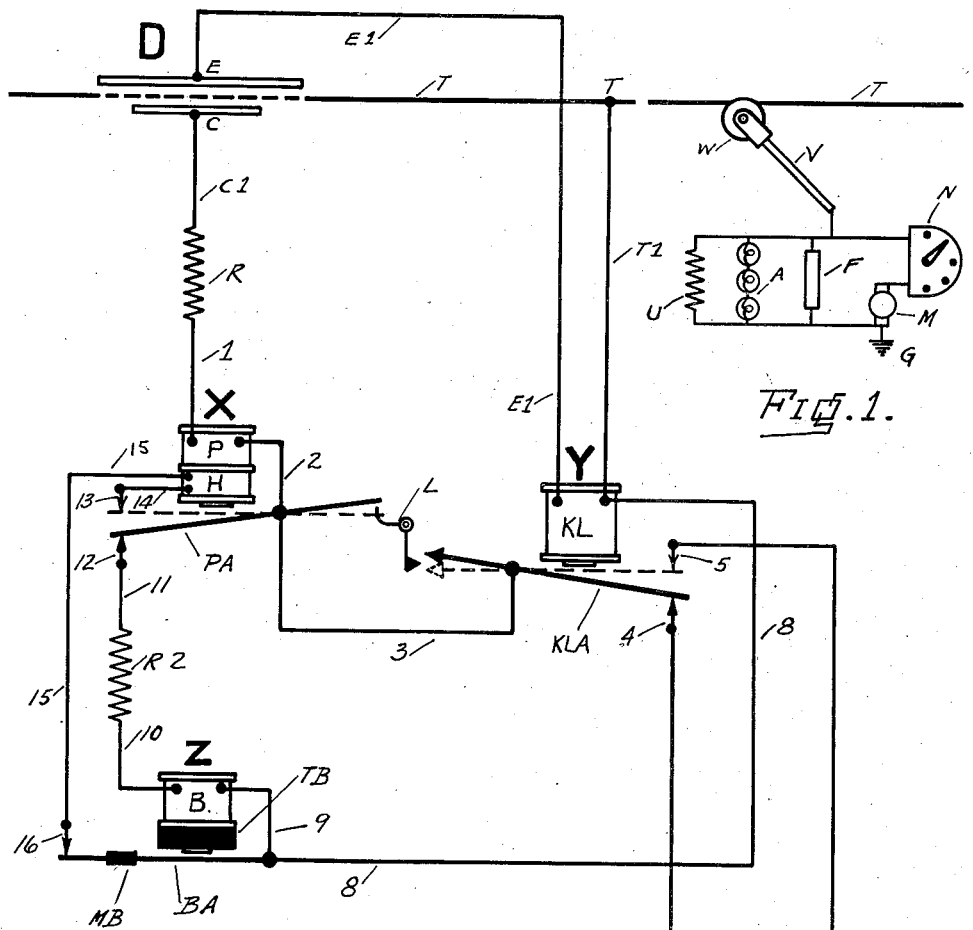
Figure 1 is a schematic drawing showing the general arrangement of circuits and parts usually found in an electrically operated car and which are taken into account in the operation of my invention.
Figure 2:
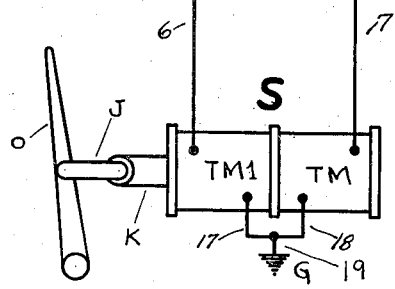
Figure 2 is a schematic drawing showing the arrangement of parts and circuits when the system is in a normal condition. Under such circumstances, however, the switch tongue may be shown in either of its operable positions.

In the system shown in Fig. 2, the letter T represents a trolley wire or current conductor. Positioned adjacent the trolley conductor is a pan or trolley contactor D provided with two laterally disposed contact members E and C which are usually parallel and normally insulated from each other and the trolley wire T. The contact member E is electrically connected to the trolley conductor T at all times but the member C is normally insulated therefrom, but is electrically connected thereto when the collector W engages the pan or trolley contactor D. The contact members E and C are so related to the trolley conductor T that when the current collector engages the contact members it will pass out of engagement with the trolley conductor T and remain so until the current collector is about to pass out of contact engagement with the pan or trolley contactor D. Such an arrangement of contact members and current conductor is well known to those skilled in the art.

I also employ an electrically operated track switch S provided with two solenoids TM and TMI, each having a common connection to the ground G through the common conductor 19. The solenoids are provided with a reciprocating plunger K which is drawn inwardly when the solenoid TM is energized and is drawn outwardly when the solenoid TMI is energized. The plunger K is connected to the switch tongue O by means of the connecting link J.

I also employ an electrically operated normally open relay Y provided with an operating coil KL and an armature KLA. The operating coil KL is mounted on a magnet core and is arranged in magnetic relation with its operating armature, which is also true of the other relays later referred to, although a moving plunger may be substituted for the magnet core and armature, and is well known to those skilled in the art. One terminal of the operating coil KL is connected to the trolley conductor T, through wire T1, and the other coil terminal is connected to the contact member E of trolley contactor D through wire E1. The switch arm KLA is normally in its free state, that is, not influenced by any magnetic flux, and rests against the normally closed back contact 4 of relay Y which is connected through wire 6, to the track switch operating solenoid TM1. The armature KLA is connected through wire 3 to the armature PA of relay X. Relay Y is also provided with a normally disengaged front contact 5, which is connected through wire 7 to the track switch operating solenoid TM.

When the current collector W engages the trolley contactor D with power on, and a sufficiently high current flows through the operating coil KL of relay Y, the armature KLA will disengage the normally engaged back contact 4 and come into contact engagement with the normally disengaged front contact 5.

I also employ an electrically operated relay X which is initially operated by the current collector W engaging the contact member C of the trolley contactor D. The relay X is provided with a main operating coil P of relatively high resistance, and a holding coil H of relatively low resistance arranged to carry the heavy currents ordinarily employed for track switch operation. The relay X is also provided with an armature PA which is normally in its free state, that is, not affected by any magnetic flux, and is normally in contact engagement with its back contact 12, which is connected through wire 11 resistance unit R2, wire 10 to one coil terminal of the operating coil B of relay Z. The normally disengaged front contact 13 is connected through wire 14 to the holding coil H of relay X. The other coil terminal of the coil H is connected through wire 15 to the normally engaged front contact 16 of relay Z. One coil terminal of the operating coil P is connected to the armature PA of relay X through wire 2, while the other coil terminal of the operating coil P is connected through wire 1, resistance unit R, wire C1 to the contact member C of the trolley contactor D.

The relays X and Y are arranged and provided with a mechanical interlocking lever between their respective armatures PA and KLA. Inasmuch as the armature KLA of relay Y is affected in advance of the operation of the relay X, through the relative spacing of the contact members C and E, the armature KLA will be in either of its operable positions before the current collector W engages the contact member C. As soon as the current collector W engages the contact member C, the operating coil P will be sufficiently energized so as to affect its armature PA and bring it into contact engagement with its normally disengaged front contact 13. Incident to this operation the mechanical interlocking latch L will be operated to hold the armature KLA in either of its operable positions as long as the current collector W engages the contact member C and until current has ceased to flow in the switch operating circuit. The operation of the armature PA of relay X and the interlocking latch L will so lock the armature KLA of relay Y in such a manner as to prevent any subsequent change in its operating condition irrespective of the magnitude of the current flowing through the operating coil KL of relay Y. This is a very desirable feature in automatic switch operation, inasmuch as it is impossible for the car operator to reverse his selection after the current collector W has effected the control for establishing switch operation.

The relay Z that I employ has in addition to its operating coil B, a copper slug TB and an armature BA. The armature BA of relay Z, and the normally engaged front contact 16 of relay Z are operated within a magnetic blowout which is symbolically represented by the characters MB. The construction and employment of such magnetic blowout arrangement to carry and break heavy currents is well known to those skilled in the art. One coil terminal of the coil B is connected to the armature BA of relay Z through wire 9, and the other coil terminal of coil B is connected to the back contact 12 of relay X as heretofore mentioned. The relay Z is normally energized, that is, normally a current of sufficient magnitude is flowing through the relatively high resistance coil B to retain the armature BA in contact engagement with its front contact 16. The copper slug TB employed on the relay Z is so arranged as to produce a retarded release time element factor for the armature BA, and this principle is well known to those skilled in the art. It is also evident that this retardation may be brought about by other various well known established principles, in regard to such devices as a dash pot arrangement, a differential relay coil arrangement, or it may be brought about by the spacing of the armature with respect to the core when in the closed position, or a combination of these.

In the device herein described and disclosed the copper slug placed about the core of the relay coil indicated by the character TB has been employed in preference to the other arrangements since there are no moving parts to interfere or alter the operation of the time element device.

If the current collector W initially engages the trolley contactor D with power off, the contact members E and C will be electrically connected and of the same potential as the trolley wire, since the contact member E is electrically connected to the trolley conductor T at all times through wire T1, connecting the trolley conductor T and the low resistance relay coil KL, and wire E1 connecting the other terminal of the operating coil KL and contact member E of the trolley contactor D. The operating coil KL of relay Y has a very low resistance, as it usually consists of approximately ten or twelve turns of #6 copper wire. The relay Y is a "current selective" relay, that is, a very heavy current must pass through its operating coil KL before its armature KLA can be affected. As soon as the contact member C is electrically connected to the trolley conductor, through the manner just mentioned, current will flow from the trolley conductor T, through wire T1, operating coil KL of relay Y, wire E1, contact member E of trolley contactor D, through the current collector W, through contact member C of the trolley contactor D, wire C1, resistance unit R, wire 1, relatively high resistance coil P of relay X, wire 2, wire 3, armature KLA of relay Y, back contact 4 of relay Y, wire 6, operating solenoid TMI of track switch S, wire 17, wire 19 to the ground G, and the operating coil P of relay X will be sufficiently energized to affect its armature PA in such a manner as to cause it to disengage the normally engaged back contact 12 and come into engagement with the normally disengaged front contact 13. Incident to the contact engagement of the armature PA and the front contact 13 of relay X, the mechanical interlocking latch L will be affected in such a manner as to engage the armature KLA of relay Y and lock it in contact engagement with the back contact 4 of relay Y. As was described the current for the operation of relay X was taken through the solenoid TMI of the track switch mechanism S, but it should be understood that the current in this circuit is always very small, say less than one ampere, and will have no effect on the solenoid TMI that could cause an operation of the track switch, since a very heavy current is required in this solenoid circuit before switch operation can occur. When the armature PA was brought into contact engagement with the front contact 13 of relay X an immediate flow of current for the energization of the solenoid TMI resulted. This circuit was completed from the trolley conductor T, through wire TI, wire 8, armature BA of relay Z, front contact 16 of relay Z, wire 15, relatively low resistance holding coil H of relay X, wire 14, front contact 13 of relay X, armature PA, wire 3, armature KLA of relay Y, back contact 4 of relay Y, wire 6, solenoid TMI of track switch S, wire 17, wire 19 to the ground G, and the track switch mechanism will operate the track switch to the straight ahead position, as is arranged and described heretofore.

Since the current for the energization of the solenoid TMI was taken through the holding coil H of relay X, the holding coil will be sufficiently energized so as to retain the armature PA in contact engagement with the front contact 13 and retain the mechanical interlock on the armature KLA as long as current continues to flow in this circuit. When the armature PA was brought into contact engagement with the front contact 13 of relay X, it was brought out of contact engagement with the back contact 12, and since the circuit for the energization of the operating coil B of relay Z was completed through this contact engagement, the coil B will become deenergized and effect the releasing of its armature BA. As was previously described the armature BA of relay Z is provided with a retarded release time element factor represented by the characters TB, and the armature BA will not immediately disengage the front contact 16. After a predetermined time, however, the armature BA will disengage the front contact 16 of relay Z and the heavy current flowing through these contacts will be broken within a magnetic blowout arc chute represented by the characters MB, and the circuit completed for the energization of the track switch operating solenoids will be interrupted at this point. If the current collector W continues to remain in contact engagement with the contact members E and C, the operating coil P of relay X will remain energized, as previously described, and the armature PA will be held out of contact engagement with the back contact 12 and the mechanical interlock on the armature KLA will be retained. The continued disengagement of the armature PA and back contact 12 of relay X will retain the operating circuit of coil B of relay Z open, and the armature BA of relay Z will likewise remain in the released position until the current collector W disengages the trolley contactor D and the armature PA reestablishes the operating circuit of relay Z.

If the current collector W initially engages the trolley contactor D with "power on" a relatively heavy current, as employed for the propulsion of the car, will be taken through the operating coil KL of relay Y, and the armature KLA will be brought out of contact engagement with the normally engaged back contact 4 of relay Y and into contact engagement with front contact 5 of relay Y. As soon as the current collector advances and comes into contact engagement with the contact member C the relay X will operate in the same manner as was previously described for the "power off" position, and the mechanical interlocking latch L will be affected to retain the armature KLA in contact engagement with the front contact 5. The armature PA will be retained in contact engagement with the front contact 13 of relay X in the same manner as was described for the "power off" position, and the relay Z will function in the same manner after a predetermined time to interrupt the current flowing to the track switch mechanism S. The circuit for the energization of the "curve" switch operating solenoid TM was completed from the current conductor T, through wire TI, wire 8, armature BA of relay Z, front contact 16 of relay Z, wire 15, holding coil H of relay X, wire 14, front contact 13 of relay X, armature PA, wire 3, armature KLA of relay Y, front contact 5 of relay Y, wire 7, solenoid TM of track switch S, wire 18, wire 19 to the ground G.

To sum up the operation of the system, if the car operator desires to go "straight ahead", the car controller is moved to the "power off" position with the intention of coasting past the trolley contactor D. As soon as the current collector W engages the trolley contactor D the relay control will be affected in a manner as previously described and the track switch will operate to the straight ahead position.

Should the car operator desire to take the "curve" position he will move his controller to the "power on" position with the intention of passing the trolley contactor using power. When the current collector W engages the trolley contactor D with power on, the relay control will be affected in such a manner as to operate the track switch mechanism to the "curve" position.

There are, of course, modifications and arrangements of the parts which may be made from that shown in the above disclosure and which may still fall within the scope of my invention.

I claim—

1. In a switch operating system, the combination of an electrically operated track switch, a trolley contactor to be engaged by a current collector, an actuating solenoid, a relay operable to selectively direct currents through different parts of the said actuating solenoid, a second normally energized relay provided with a retarded release time element factor, for controlling the current flowing to the said switch solenoid, and a third relay operable to close the said switch operating circuit and effect the deenergization of the said second relay, and a means affected by the said third relay to retain the selection of the first said relay as long as operating current is flowing to the said solenoid and as long as the current collector engages the said contactor.

2. In an electric switch operating device, in combination with a track solenoid, trolley conductor and trolley contactor to be engaged by a current collector, a normally open switch operating circuit connecting the trolley conductor and track solenoid, means responsive to the engagement of the current collector with the trolley contactor for closing the said circuit, a normally energized relay controlling a normally closed switch provided with a time element release, said switch included in the said normally open circuit to permit energization of the said track solenoid for a predetermined time and means responsive to the engagement of the current collector with the trolley contactor to de-energize the said relay prior to the operation of the first named means to close the said circuit.

3. In a switch operating system, the combination of an electrically operated track switch, a branched operating circuit, a circuit changer for the said operating circuit provided with a positioning coil and means for retaining it in each of its operative positions, a normally energized relay controlling the said operating circuit, electrically operated means provided with a pick up coil and a holding coil so arranged as to open the circuit of the normally energized relay controlling the said operating circuit and to place the said holding coil in circuit with the said operating circuit.

4. In a relay system, comprising an electrically operated switch adapted to be moved to either of two positions, and a second electrically operated switch adapted to control a normally closed circuit including the first said switch, mechanical means affected by the said second switch for retaining the position of the first said switch.

5. In a switch operating system, the combination of a trolley contactor and a current conductor, an electrically operated track switch, control means electrically connected to the conductor and trolley contactor and having other circuits leading to the said contactor and track switch for positioning the track switch in either of two directions when the trolley contactor is engaged with "power on" or "power off", a normally closed switch to control the current to the track switch interposed in one of the circuits leading to the said control means, and means to open the said normally closed switch to interrupt the current to the track switch a predetermined time after the current collector has engaged the trolley contactor, and means operative upon engagement of the current collector with the trolley contactor to direct current to the said track switch and retain the said control means in either of its operable positions as long as current is flowing to the track switch and as long as the current collector continues to engage the said contactor.

6. In a switch operating system, the combination of a trolley contactor and a current conductor, and an electrically operated track switch, an electrically operated control means connected to the contactor and current conductor having other circuits leading to the contactor and track switch to operate the switch in either of two directions when the contactor is engaged with "power on" or "power off", a normally closed switch in one of the circuits leading from the control means to open the said circuit a predetermined time after the collector has engaged the contactor, and means operable to direct current to the track switch comprising an electrically operated switch having a coil arranged to be placed in series with the said circuit, and a second coil associated with the said means to close the said circuit when the contactor is engaged by the current collector, and mechanical means affected by the said means for retaining the selection of the said control means as long as current is flowing to a track switch and as long as the current collector continues to engage the said contactor.

7. In a switch operating system, the combination of a trolley contactor and a current conductor, and an electrically operated track switch, an electrically operated control means connected to the contactor and current conductor having other circuits leading to the contactor and track switch to operate the switch in either of two directions when the contactor is engaged with "power on" or "power off", a normally closed switch in one of the circuits leading from the control means to open the said circuit a predetermined time after the collector has engaged the contactor, and means operable to insure current to the track switch for the said predetermined time comprising an electrically operated switch having a coil arranged to be placed in series with the said circuit and being so arranged as to normally maintain the circuit open, and a second coil associated with the said means to close the said circuit when the contactor is engaged by the current collector, said means also operable to retain the said electrically operated control means in either of its two operable positions while current is flowing to the track switch and as long as the current collector continues to engage the said contactor.

8. In a switch operating system in combination with a trolley contactor, current conductor, an electrically operated switch movable to different positions, and an electrically operated switch to control the operation of the first said switch, circuits connecting the various parts to operate the first said switch to its proper position when the contactor is initially engaged by the current collector with "power on" or "power off", one of the said circuits being a normally closed path from the conductor to the said second switch, means to open the said path after the collector engages the trolley contactor and means to maintain the switch operating current to the system for a predetermined time regardless of the position of the current collector after engagement with the contactor, and means affected by the first said means to retain the said second switch in either of its operable positions as long as the switch operating current is flowing in the system and as long as the current collector engages the said contactor.

9. In a relay system of the class described, the combination comprising an electrically operated switch arm KLA adapted to be moved to either of two positions, and a second electrically operated switch arm PA adapted to close a circuit including the first said switch arm, and mechanical means affected by the said second switch arm for retaining the position of the first said switch only when the said second switch is operated to close the said circuit.

10. In a relay system of the class described, the combination comprising an electrically operated switch arm KLA adapted to be moved to either of two positions, and a second electrically operated switch arm PA adapted to close a circuit including the first said switch arm, and a means affected by the said second switch arm for retaining the first said switch arm in either of its operable positions only when the said second switch is operated to close the said second circuit.

11. In a track switch operating system of the class described, the combination comprising a trolley contactor D, a current conductor T, a switch operating device S, an electrically operated switch KLA movable to different positions, and an electrically operated switch PA, means for operating the switch KLA to its proper position when the contactor contact member E is initially engaged by the current collector W with "power on" or "power off," a normally closed circuit connecting the conductor T, including the operating coil of a time element relay switch and a normally closed contact of switch PA, electromagnetic means to operate the switch PA for opening the said circuit when the collector W engages the contactor contact member C to deenergize the said operating coil, and means affected thereby permitting operating current to flow in the said switch operating device S for a predetermined time regardless of the position of the current collector W after engagement with the contactor contact member C, and additional means actuated by the operation of the said electro-magnetic means to retain the switch KLA in either of its positions as long as the switch operating current is flowing in the system and as long as the current collector engages the contactor contact member C.

12. In a switch operating system, the combination of an electrically operated track switch, a trolley contactor to be engaged by a current collector, an actuating solenoid, a normally open switch operating circuit including the said solenoid a relay operable to selectively direct current in the said operating circuit through different parts of the said actuating solenoid, a second normally energized relay provided with a retarded release time element switch included in the said operating circuit for controlling the current flowing to the said switch solenoid, and a third relay operable to close the said normally open switch operating circuit and effect the deenergization of the said second relay and means for establishing the first relay circuit before establishing the third relay circuit.

13. An arrangement according to claim 12 wherein the first and third relays are arranged in series between the trolley conductor and ground through the current collector and trolley contactor, and wherein the resistance of this series circuit is of such value that the flow of current through both relay coils will be only enough to actuate one of them.

14. In a device according to claim 12 wherein the first and third relays are connected in series from the trolley conductor through the first relay, through the trolley contactor and current collector, and through the said third relay to ground, and means whereby the current flowing from the trolley conductor through the car motors to the ground flows through the first relay.

15. In a switch operating system, the combination of an electrically operated track switch, a branched operating circuit, a circuit changer for the said operating circuit provided with a positioning coil, a normally energized relay controlling the said operating circuit, electrically operated means provided with a pick up coil and a holding coil so arranged as to open the circuit of the normally energized relay controlling the said operating circuit and to place the said holding coil in circuit with the said operating circuit and means for energizing the said positioning coil before energizing the said pick up coil.

16. In a switch operating system, the combination of an electrically operated track switch, a current conductor, a trolley contactor comprising a short contact element and a long contact element arranged to be engaged by a current collector, an actuating solenoid, a relay operable to selectively direct currents through different parts of the said actuating solenoid, a second normally energized relay provided with a retarded release time element factor, for controlling the current flowing to the said switch solenoid, and a third relay operable to close the said switch operating circuit and effect the deenergization of the said second relay, wherein the first and third relays are connected in series from the current conductor through the first relay, through the long contact element, the current collector, the short contact element and third relay to ground and whereby the current flowing from the current collector through the car motors to the ground flows through the long element and first relay before the current collector contacts with the short element.

17. In a switch operating system, the combination of a contact pan and trolley wire, an electrically operated track switch, control means electrically connected to the trolley wire and pan and having other circuits leading to the pan and track switch for positioning the track switch in either of two directions when the pan is engaged by a current collector with "power on" or "power off", a normally closed switch to control the current to the track switch and interposed in one of the circuits leading to the control means, and means to open the normally closed switch to interrupt the current to the track switch after a predetermined lapse of time after the collector has engaged the pan and regardless of whether the collector continues to engage the pan or not, and means operating automatically upon engagement of the current collector with the pan to insure current to the track switch for the said predetermined time, and mechanical means operating automatically when current is directed to the said track switch to insure the positioning of the track switch in accordance with the initial engagement of the current collector with the pan with "power on" or "power off".

18. In a switch operating system, the combination of a contact pan and trolley wire, an electrically operated track switch, electrically operated control means connected to the pan and trolley wire and having other circuits leading to the pan and track switch to operate the switch in either of two directions when the pan is engaged by a current collector with "power on" or "power off", a normally closed switch in one of the circuits leading from the control means for opening the circuit after a predetermined time after the collector has engaged the pan, means to insure current to the track switch for the said predetermined time comprising an electrically operated switch having a coil in series with one of the circuits from the control means and being arranged to normally maintain an open circuit from the trolley wire to the circuit connected to the coil and to close the circuit when the pan is engaged by the collector, and mechanical means affected by the said electrically operated switch for retaining the selection of the control means as long as current is flowing to the track switch and as long as the current collector engages the pan.

19. In a switch operating system, the combination of a contact pan having a pair of contact members to be engaged by a current collector, a trolley wire, an electrically operated track switch, a selector switch having control means connected to one contact member and the trolley wire, circuits leading from the selector switch to the track switch, a circuit of relatively high resistance leading from the selector switch and connected to the other contact member and having included therein a coil, a switch controlled by the said coil and adapted to close a circuit from the trolley wire, the said circuit including a second coil of relatively low resistance and a ground for the system, the parts arranged to operate "power on" or "power off" to position the track switch and to prevent current flowing to the track switch after a predetermined time after the collector engages the pan and to maintain current to the track switch for said predetermined time regardless of the position of the collector after it has initially engaged the pan, and mechanical means affected by the said switch for retaining the selector switch in its actuated position as long as current flows to the track switch and as long as the current collector engages the pan.

20. In a switch operating system, the combination of a contact pan to be engaged by a current collector, a trolley wire connected to said pan, an electrically operated track switch, means for directing current to the different parts of the said track switch in accordance with predetermined conditions, means for establishing a current flow to the said track switch, and still other means for maintaining current to the track switch for a predetermined length of time after engagement of the collector with the pan to operate the switch in the desired direction, and additional means actuated by the said second means for mechanically locking the first said means against operation during the predetermined lapse of time.

21. In a switch operating system, the combination of a contact pan to be engaged by a current collector, a trolley wire connected to said pan, an electrically operated track switch, means for directing current to the different parts of the said track switch in accordance with predetermined conditions, means for establishing a current flow to the said track switch, and still other means for maintaining current to the track switch for a predetermined length of time after engagement of the collector with the pan to operate the switch in the desired direction, and additional means actuated by the said second means for mechanically locking the first said means against operation during the predetermined lapse of time and as long as the collector continues to engage the pan.

22. In a switch operating system, the combination with an electrically operated track switch, a selector switch, a trolley wire and contact pan all connected and arranged to operate "power on" and "power off" the system to move the track switch to a desired position, of means to maintain current to the track switch for a predetermined time, and additional means for mechanically locking the selector switch to prevent a change in position of said selector switch during said predetermined lapse of time.

23. In a switch operating system, the combination of a contact pan having two contact members to be engaged by a current collector, a source of power, an electrically operated switch to be moved in different directions depending upon the collector engaging the pan with "power on" or "power off", a selector switch controlling a branched circuit from the pan to the said switch and having an operating coil connected to the pan and source of power, an electrically operated switch for connecting the selector switch direct to the source of power after the collector has engaged the pan, and an electrically operated time limit switch normally closing said circuit and arranged to remain closed after the initial engagement of the collector with the pan and for a predetermined time and to automatically open a branch of the aforesaid circuits and to maintain said branch open after said predetermined time if the collector still engages the pan and to automatically close after the collector has passed out of engagement with the pan, and mechanical means affected by the said second electrically operated switch for retaining the selection of the said selector switch for the predetermined time and as long as the collector engages the pan.

24. A switch operating system comprising in combination, a trolley conductor, a pan to be engaged by a current collector, an electrically operated track switch, a normally open power circuit to conduct current to the track switch, a selector switch controlling said circuit to operate the track switch to a desired position when the collector engages the pan with "power on" or "power off", an electrically operated relay switch to close the power circuit when the collector engages the pan, a holding coil for the said relay switch and energized by the current in said power circuit to hold the relay switch closed after said initial operation, and means for deenergizing the holding coil a predetermined time after the said relay is operated, and additional means affected by the said electrically operated relay switch for mechanically locking the said selector switch to retain the selection of the selector switch for the said predetermined time.

FRANK H. RICHTERKESSING.